(No Model.)

B. MARTIN.
WATER FILTER.

No. 493,633. Patented Mar. 21, 1893.

WITNESSES:
Charles S. Watson.
Fanny Robbins.

INVENTOR
Bruno Martin

BY
Swarthout
ATTORNEY

UNITED STATES PATENT OFFICE.

BRUNO MARTIN, OF SAGINAW, MICHIGAN.

WATER-FILTER.

SPECIFICATION forming part of Letters Patent No. 493,633, dated March 21, 1893.

Application filed September 21, 1892. Serial No. 446,419. (No model.)

*To all whom it may concern:*

Be it known that I, BRUNO MARTIN, a citizen of the United States, residing at Saginaw, in the county of Saginaw and State of Michigan, have invented certain new and useful Improvements in Water-Filters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention is a water filter, and consists in the arrangement and combination of its parts.

Figures 1, 3:
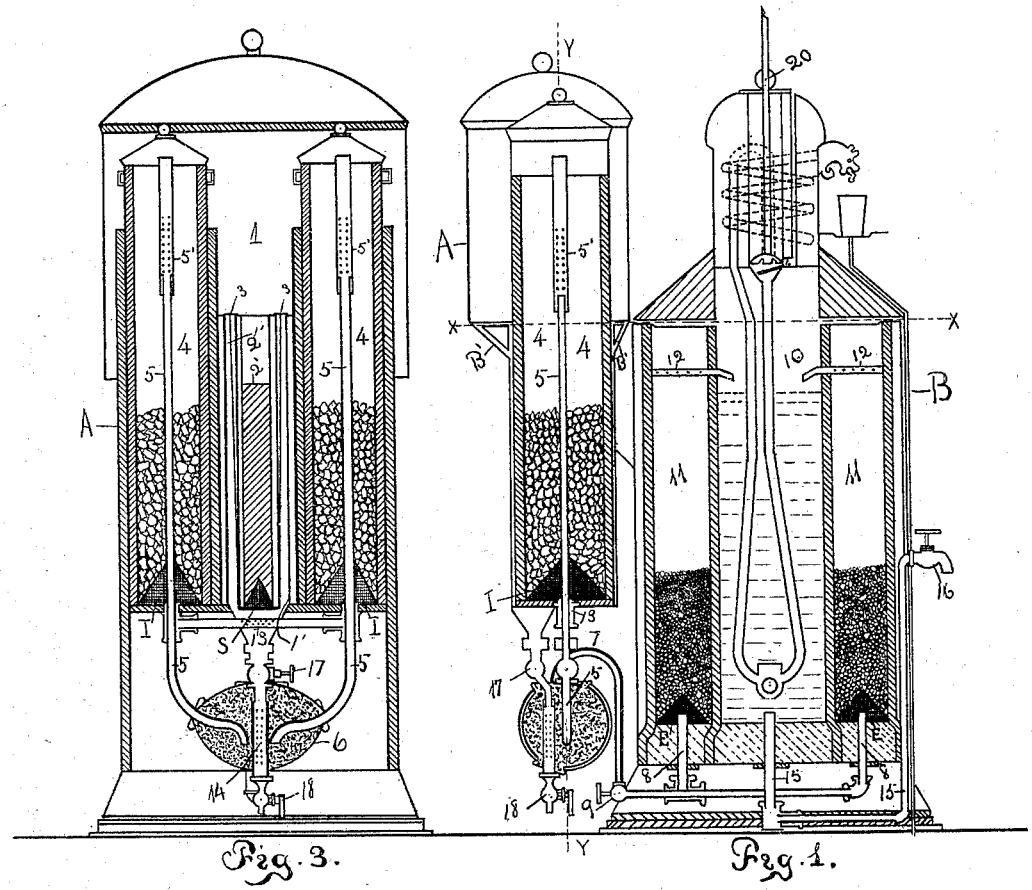
Figure 4:
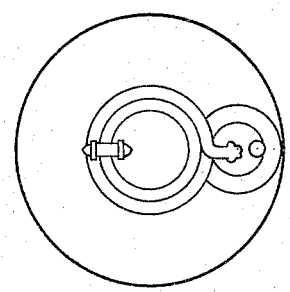
Figure 2:
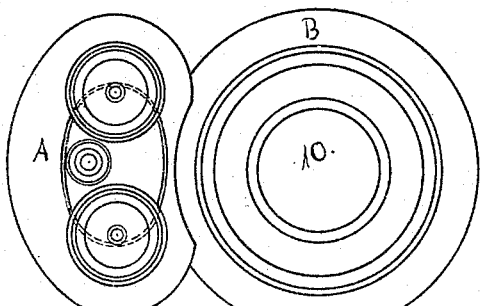

Figure 1., is a side sectional elevation. Fig. 2., is a sectional view on line X—X of Fig. 1. Fig. 3., is a rear sectional view on line Y—Y of Fig. 1. Fig. 4., is a top view.

The filter frame is divided into two main parts, A and B; A is supported on the rear of B by bracket B'.

A is a large tank divided into compartments, viz; the water receptacle 1 in the top. Depending from the bottom of 1 is a large central tube 1' and in this tube is suspended in the filtering cloth, 3, a tube 2, containing a filtering composition 2', the bottom of the tube 2, being provided with a fine sieve S, to allow the water to pass through from the composition into the bag or filtering cloth 3 in which the tube 2 is suspended. After passing through the bag 3 the water passes out the bottom of tube 1' into pipe 13 underneath.

4, 4, are filtering tanks located at the side of tube 1' there may be one or more, and contain charcoal or other purifying material. These tanks 4 4 are connected at their bottom to the conveying pipe 13 and provided with a sieve I, just above their bottom to prevent the charcoal passing into the pipe 13. Passing through the tanks 4 4 is a tube 5 and connected to a basin 6 at its under side. The upper part of the tube 5 is made of gauze sieve 5'. The water conveyed into the bottom of tanks 4, is forced up through the charcoal, by the weight of the water in tank 1, to near the top of tanks 4 when it passes into tube 5 through sieve 5'.

6 is a globe or basin suspended underneath A by the tubes, 5, 5, and the drain pipe 14 connected to the pipe 13 underneath the tube 1', which is provided with a stop cock 17 to prevent the water passing through pipe 14 from 13 except when cleaning as hereinafter mentioned. The pipe 14 inside of globe 6 is full of perforations to allow water to pass into it when desired when cleaning, and for this purpose it is provided at its lower end with a faucet 18. Within the globe 6 I place fine sand; the water passing into the globe at or near the bottom runs up through the sand; to the top of the globe 6 I connect a pipe 7 and convey the water by means of it through the bottom of the part B. B contains a central chamber 10 and surrounding 10 another chamber 11. In the bottom of chamber 11 I place a fine sieve E; and to the bottom of this chamber I convey the water by means of pipes 8 8 connected to the pipe 7 in the bottom of B, and to the bottom of chamber 11. In this chamber I place another purifying material such as fine gravel and the water passes from pipe 7 up through the gravel and rises in the chamber to and through tubes 12, which pass from chamber 11 into central chamber until drawn off for use through pipe 15 at its bottom, or by means of the pump 20 shown in the drawings. By this process of filtration the water does not settle or soak through any filtering substance except in the first part of its filtration in passing through tube 2 and bag 3. In going through the other filtering substances it passes from the bottom upward, and all impurities and sediment will be deposited on the lower part of the filtering material instead of upon the top, the pure water being forced up and drawn off as indicated instead of being at the bottom as is common, to be contaminated by the impurities working down through the filter as they cannot but do in old style of filters.

I have not specified the method of connecting pipes and tanks, as any well known means may be employed.

I have already indicated somewhat how the filter may be cleaned; at the point of junction of pipe 7 to part B, I place a stop cock 9, for the purpose of stopping the flow of water when the chamber 10 is full and for the purpose of cleaning. The parts 2 and 4 may be lifted out of A and cleaned, or opening the stop cocks 17 and 18 will allow the water in them to be removed and as it runs out wash out the sediment &c., deposited on the pipes and filter during filtration; opening the stop cock 9 will also let the water out of chamber 11 when it can be rinsed out.

Having thus described my invention, what I claim as new, and desire to secure by Letters Patent, is—

A water filter consisting of a water tank 1, a pipe 1', depending therefrom, a tube 2, containing filtering material suspended in pipe 1' by a bag made of filtering cloth, and the bag 3, the tube 2 provided with a sieve S, in its lower end, one or more filtering tanks, 4, 4, containing purifying substance and connected at its base by a pipe 13 to pipe 1', the bottom of said tanks 4 being about on line with bottom of pipe 1', and provided in their bottoms with sieve I, and having passing through their length the pipe 5, having in its upper part the sieve 5' and connected at its lower end to the bottom of the basin 6 containing purifying material, the chamber 11, provided with a sieve E in its base, and containing a filtering substance and connected to the basin 6 by the pipes 7 from top of basin 6, the bottom of chamber 11 being on line or below bottom of tank 1, the chamber or reservoir 10 within chamber 11, and connected thereto by pipes 12, and means for drawing water therefrom, substantially as described and as and for the purpose set forth.

In testimony whereof I affix my signature in presence of two witnesses.

BRUNO MARTIN.

Witnesses:
A. H. SWARTHOUT,
GEORGE A. MCLANDRESS.